United States Patent [19]
Harrison

[11] Patent Number: 5,131,184
[45] Date of Patent: Jul. 21, 1992

[54] MINNOW TRAP APPARATUS

[76] Inventor: James E. Harrison, 130 E. Dunklin, Jefferson City, Mo. 65101

[21] Appl. No.: 641,448

[22] Filed: Jan. 14, 1991

[51] Int. Cl.$^5$ ............................................. A01K 69/00
[52] U.S. Cl. ......................................... 43/100; 43/103
[58] Field of Search ............................ 43/100, 55, 103

[56] References Cited

U.S. PATENT DOCUMENTS

| | | | |
|---|---|---|---|
| 2,111,959 | 3/1938 | Baxter | 43/55 |
| 2,912,785 | 11/1959 | Nudell | 43/100 |
| 3,099,890 | 8/1963 | Madere | 43/100 |
| 3,387,403 | 6/1968 | Crouch | 43/100 |
| 4,134,225 | 1/1979 | Welch | 43/100 |
| 4,680,887 | 7/1987 | Bergquist | 43/100 |

FOREIGN PATENT DOCUMENTS 1077158  7/1967  United Kingdom ................. 43/100

Primary Examiner—Richard K. Seidel
Assistant Examiner—Patty E. Hong
Attorney, Agent, or Firm—Leon Gilden

[57] ABSTRACT

An apparatus including an elongate housing formed with a funnel entrance and an exit door utilizing springs mounted on opposed sides of the housing to bias the door in a first closed position when the door is displaced relative to a foward or second portion of a top wall to provide access to an interior cavity of the housing. The housing includes a counterweight mounted medially to the bottom surface of the bottom wall of the housing, including plural pairs of spring legs to mount and permit entrenching of the minnow housing within a level or soil laden bottom support surface of a stream, lake, and the like.

4 Claims, 5 Drawing Sheets

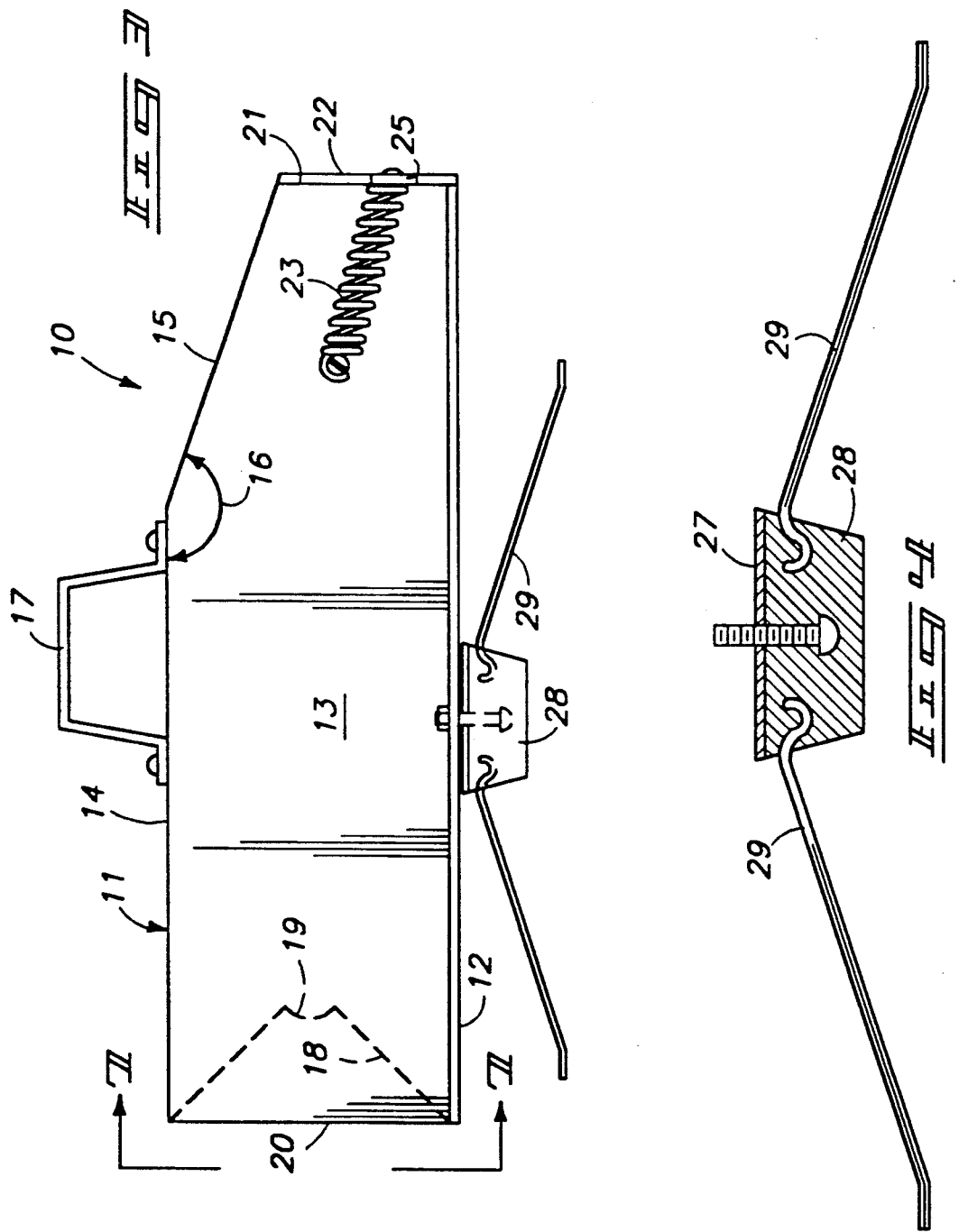

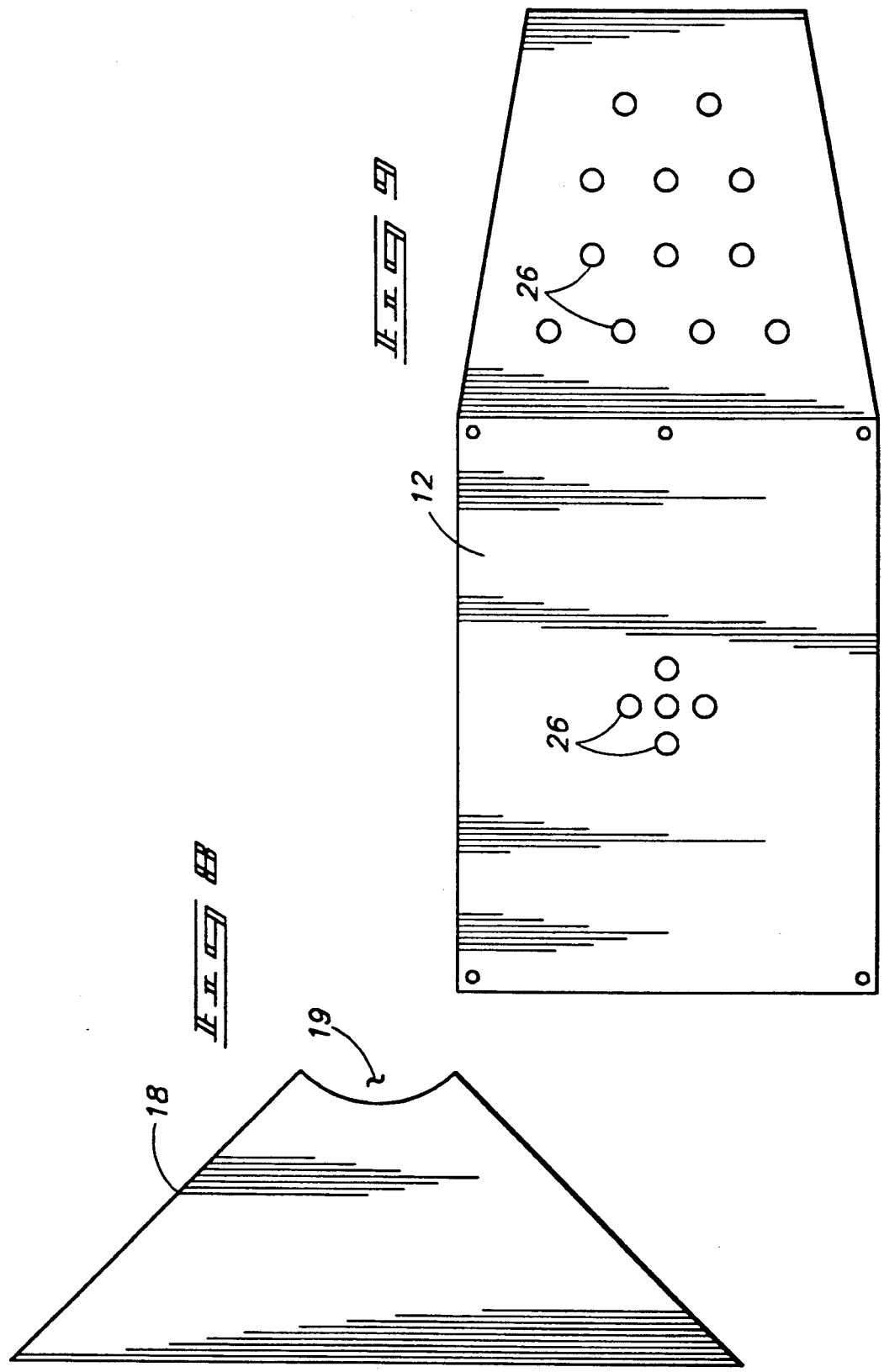

MINNOW TRAP APPARATUS

BACKGROUND OF THE INVENTION

1. Field of the Invention

The field of invention relates to trap apparatus, and more particularly pertains to a new and improved minnow trap apparatus wherein the same is arranged for ease of anchoring to a waterway bottom surface, as well as convenience of access interiorly of the housing subsequent to drainage of fluid therefrom.

2. Description of the Prior Art

Prior art minnow traps of various types have been utilized in the prior art. To access minnows contained within the trap structure, prior art apparatus has been of limited convenience for such purpose. Further, prior art trap apparatus has a tenancy to roll and shift about a waterway bottom surface a trap is mounted upon, as opposed to the instant invention utilizing spring legs to enhance anchoring and entrenching of the legs within such a bottom support surface. Examples of the prior art include U.S. Pat. No. 4,680,887 to Bergquist wherein a support stand includes parallel rods to capture and secure a unitarily constructed minnow trap member therewithin, wherein the trap utilizes a single removable entrance funnel at a forward end thereof for access interiorly of the trap structure.

U.S. Pat. No. 4,134,235 to Welch sets forth a collapsible bait trap utilizing accordion pleats to permit ease of folding of the trap structure when not in use.

U.S. Pat. No. 3,387,403 to Crouch provides for a tubular coupling mounting a generally cylindrical first and second end portion of the trap structure together.

U.S. Pat. No. 2,912,785 to Nudell sets forth a minnow bucket and trap of a generally cylindrical configuration typical of the prior art; as is U.S. Pat. No. 3,099,890 to Madere wherein the trap structure is devoid of anchoring means as set forth by the instant invention to maintain positioning of the trap structure relative to a predetermined position upon a bottom surface.

As such, it may be appreciated that there continues to be a need for a new and improved minnow trap apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of minnow trap apparatus now present in the prior art, the present invention provides a minnow trap apparatus wherein the same provides enhanced anchoring and alignment of the trap structure relative to current flow and a waterway bottom surface. As such, the general purpose of the present invention, which will be described subsequently in greater detail, is to provide a new and improved minnow trap apparatus which has all the advantages of the prior art minnow trap apparatus and none of the disadvantages.

To attain this, the present invention provides an apparatus including an elongate housing formed with a funnel entrance and an exit door utilizing springs mounted on opposed sides of the housing to bias the door in a first closed position when the door is displaced relative to a forward or second portion of a top wall to provide access to an interior cavity of the housing. The housing includes a counterweight mounted medially to the bottom surface of the bottom wall of the housing, including plural pairs of spring legs to mount and permit entrenching of the minnow housing within a level or soil laden bottom support surface of a stream, lake, and the like.

My invention resides not in any one of the these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved minnow trap apparatus which has all the advantages of the prior art minnow trap apparatus and none of the disadvantages.

It is another object of the present invention to provide a new and improved minnow trap apparatus which may be easily and efficiently manufactured and marketed.

It is a further object of the present invention to provide a new and improved minnow trap apparatus which is of a durable and reliable construction.

An even further object of the present invention is to provide a new and improved minnow trap apparatus which is susceptible of a low cost of manufacture with regard to both materials and labor, and which accordingly is then susceptible of low prices of sale to the consuming public, thereby making such minnow trap apparatus economically available to the buying public.

Still yet another object of the present invention is to provide a new and improved minnow trap apparatus which provides in the apparatuses and methods of the prior art some of the advantages thereof, while simultaneously overcoming some of the disadvantages normally associated therewith.

Still another object of the present invention is to provide a new and improved minnow trap apparatus wherein the same is arranged for enhanced anchoring of the trap in use and for ease of subsquent draining of fluid therefrom subsequent to its removal from a waterway bottom surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the instant invention.

FIG. 4 is an orthographic side view of the support leg and counterweight structure of the instant invention.

FIG. 8 is an orthographic side view of the funnel utilized by the instant invention.

FIG. 9 is an orthographic top view of the bottom floor of the instant invention.

DESCRIPTION OF THE PREFERRED EMBODIMENT

Figure 1:
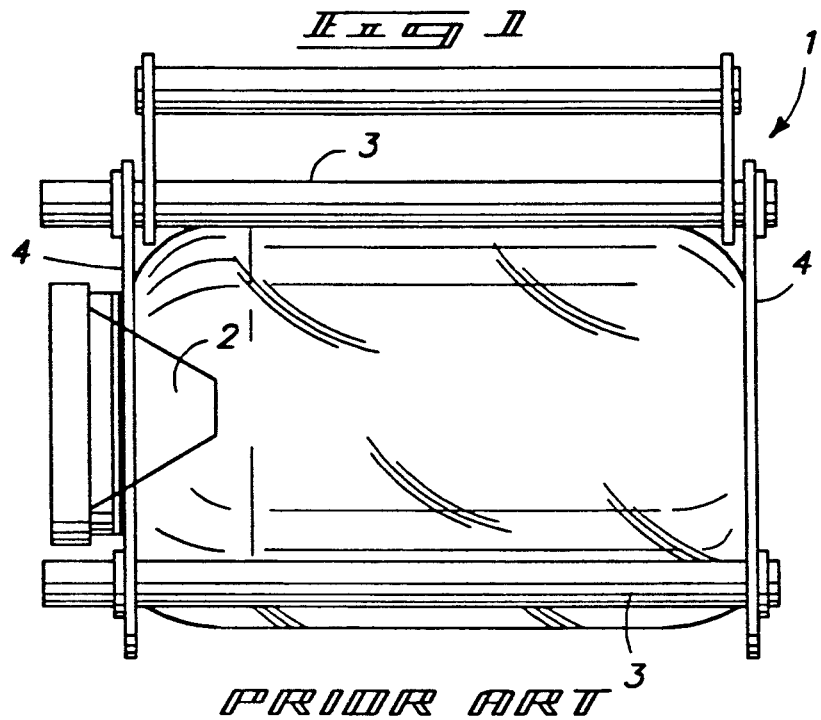
FIG. 1 is an orthographic side view, taken in elevation, of a prior art minnow trap apparatus.
Figure 2:
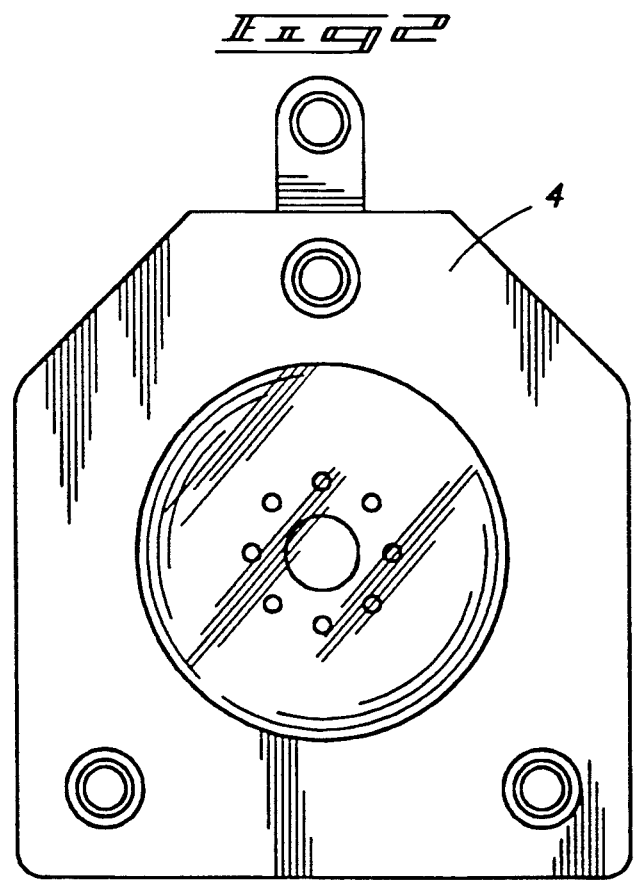
FIG. 2 is an orthographic end view, taken in elevation, of the prior art structure set forth in FIG. 1.
Figure 5:
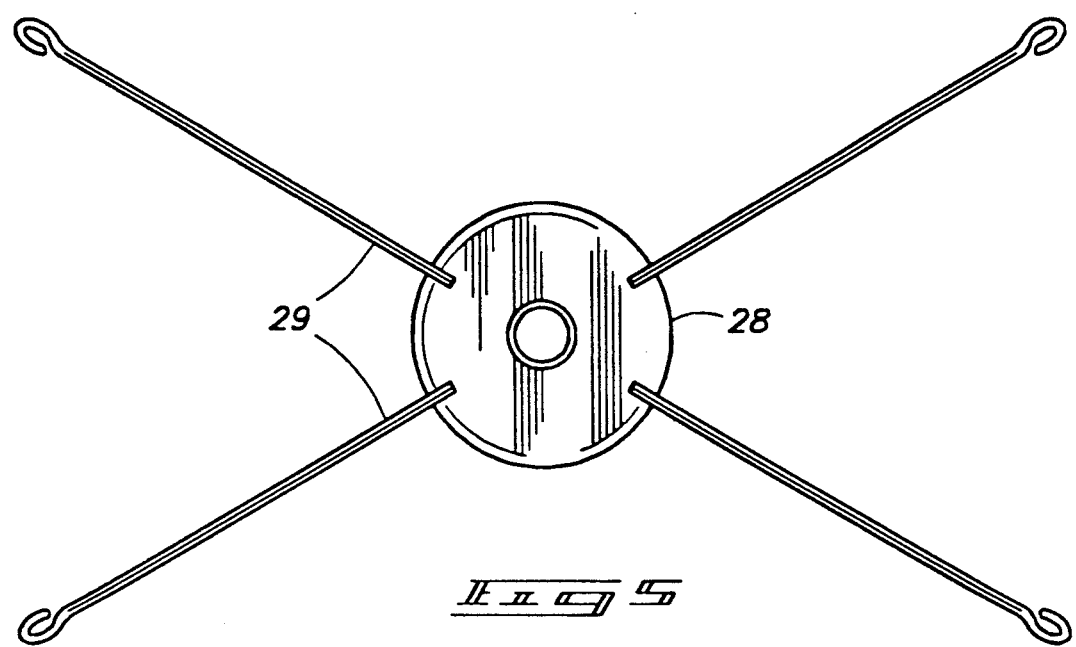
FIG. 5 is an orthographic top view of the counterweight and leg structure utilized by the instant invention.
Figure 6:
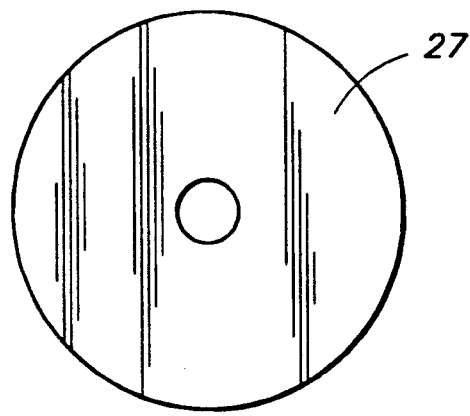
FIG. 6 is an orthographic top view of the torroidal washer utilized by the instant invention mounted between the counterweight structure and a bottom wall of the housing.
Figure 7:
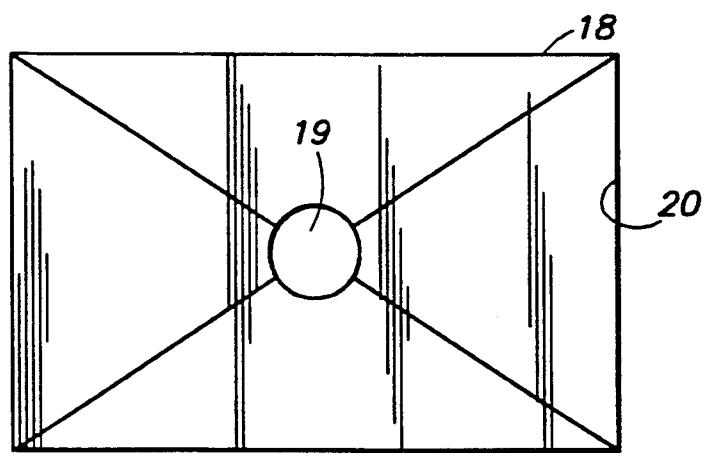
FIG. 7 is an orthographic frontal view of the funnel utilized by the instant invention.
Figure 10:
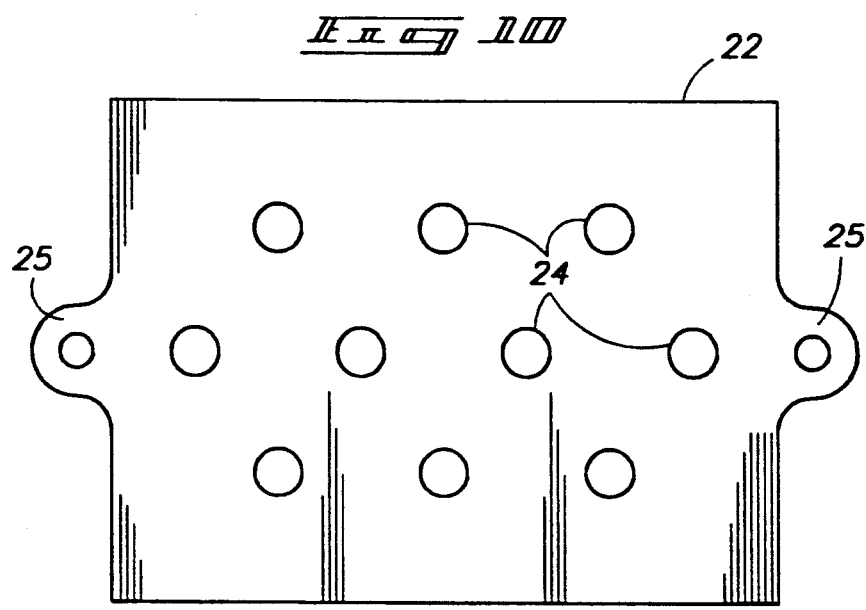
FIG. 10 is an orthographic end view of the housing exit door utilized by the instant invention.

With reference now to the drawings, and in particular to FIGS. 1 to 11 thereof, a new and improved minnow trap apparatus embodying the principles and concepts of the present invention and generally designated by the reference numeral 10 will be described.

FIG. 1 illustrates a prior art minnow trap structure 1, as presented in U.S. Pat. No. 4,680,887, wherein an elongate, unitary container includes a removable funnel to mount at a forward end thereof, wherein a plurality of parallel tubular rods 3 secure the container between spaced end plates 4.

More specifically, the minnow trap apparatus 10 of the instant invention essentially comprises an elongate housing 11, wherein the elongate housing includes planar side walls 13, with a planar first top wall 14 mounted to a second top wall 15, wherein the first and second top walls are arranged in contiguous communication relative to one another to extend coextensively overlying the planar bottom wall 12. An obtuse included angle 16 is defined between an intersection of the first and second top walls 14 and 15. It is further contemplated that the bottom wall, side walls, top wall, as well as the use of the housing exit door 22 overlying a housing exit opening 21 and the associated entrance funnel 18 mounted to an entrance opening of the housing are formed of transparent material to permit visual observation of components contained within the housing. The use of the non-apertured side and top walls minimizes current flow through the housing structure in use to maintain various bait food components contained within the housing in a relatively stationary position within the housing, as opposed to wire screen type trap structure.

Figure 11:
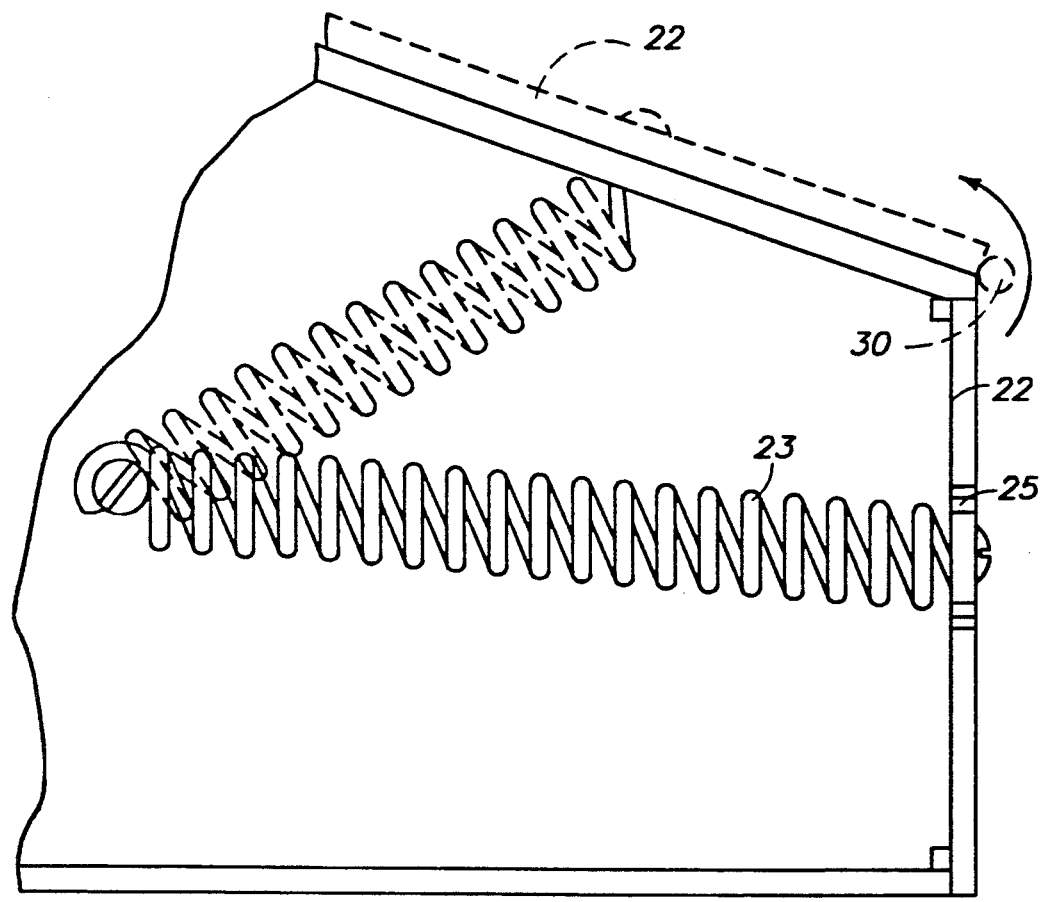
FIG. 11 is an orthographic side view of the exit door directed from a first position to a second position overlying a second top wall portion of the housing.

The entrance funnel 18 of the housing is formed fixedly to the forward end of the housing 11 to define a rectangular funnel rear entrance end, wherein the funnel is directed to a semi-spherical funnel forward exit end 19. The semi-spherical configuration, as opposed to a circular configuration minimizes loss of minnows contained within the housing structure 11. The handle 17 is mounted fixedly to the planar first top wall 14 for transport of the organization as desired. The housing exit door 22 mounted overlying the housing exit opening 21 is secured relative to the housing in a first position, as illustrated in FIG. 3, and in FIG. 11, by exit door springs 23 mounted to each side wall 13 of the housing and secured to a respective side edge ear 25 (see FIG. 10 for example) to bias the housing exit door 22 in a first position and upon displacement of the exit door 22 to the second position (see FIG. 11) to overlie a forward portion of a top surface of the planar second top wall 15. Reference to FIG. 11 illustrates the use of an optional cylindrical abutment 30 mounted coextensively to a forward terminal end of the second top wall 15 adjacent the housing exit opening to provide an abutment for the housing exit door 22 when in the second position preventing accidental displacement of the door to the first position, as illustrated in solid lines in FIGS. 11 and 3. The exit door 22 is formed with exit door apertures 24, with the bottom wall 12 formed with bottom wall apertures 24, with the bottom wall 12 formed with bottom wall apertures 26 to enhance drainage of fluid from the housing, as well as ease of filling of the housing with water when positioned in a submerged orientation relative to a fishing body of water. Further, the door apertures 24 and the bottom aperatures 26 minimize current flow through the housing and bait positioned therewithin, but provide ease of drainage of water from within the housing when removed from a submerged orientation.

The housing utilizes a counterweight 28 mounted fixedly to the bottom wall 12. The counterweight typically is in a twenty-five to thirty-five weight range to enhance stable mounting of the housing to a support floor within a fishing body of water. Further, plural pairs of spring legs 29 are mounted fixedly within the counterweight and extend exteriorly and downwardly relative thereto, wherein the spring legs enhance anchoring when positioned within a gravel or mud type floor surface as the legs outer free terminal ends will dig into such a support surface for proper anchoring of the housing in use. A fabric torroidal washer 27 is mounted between the planar bottom wall 12 and the counterweight 28 to prevent marring of the exterior surface of the bottom wall 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A minnow trap apparatus comprising,
    an elongate housing, wherein the elongate housing includes spaced side walls coextensively mounted to a bottom wall, and
    a top wall, wherein the top wall includes a first top wall extending from a rear terminal end of the bottom wall to a first position overlying the bottom wall, and a second top wall extending from the first position forwardly to a forward terminal end of the bottom wall to overlie the bottom wall, wherein the first and second top walls define an obtuse included angle defined therebetween, and
    an entrance funnel mounted between the rear terminal end of the bottom wall and the first top wall, and
    a member removably mounted overlying an exit opening of the elongate housing defined between the forward terminal end of the bottom wall and a further forward terminal end defined by the second top wall spaced above and overlying the forward terminal end of the bottom wall, and
    wherein the door includes a plurality of door apertures directed therethrough, and the door includes an ear member extending laterally of the door mounted to each side edge of the door, and a spring mounted to each ear of the door, with each spring mounted to a respective side wall of the housing to bias the door in a first position overlying the exit opening of the elongate housing and permit displacement of the door to a second position overlying the second top wall, and an elongate cylindrical abutment mounted to a further forward terminal end of the second top wall to prevent inadvertent displacement of the door from the second position.

2. An apparatus as set forth in claim 1 wherein the funnel, the side walls, the bottom wall, the top first top wall, the second top wall, and exit door are formed of transparent material.

3. An apparatus as set forth in claim 2 wherein a counterweight is mounted to the bottom surface of the bottom wall, and the counterweight includes plural pairs of spring legs mounted to the counterweight, each spring leg extending downwardly relative to the counterweight and the bottom floor, wherein each spring leg enhances embedding of each spring leg within a support surface for anchoring of the elongate housing.

4. An apparatus as set forth in claim 3 wherein the counterweight is defined by a predetermined weight within a range of twent-five to thirty-five pounds.

* * * * *